(12) United States Patent
Vaquero Gonzalez (10) Patent No.: US 10,242,042 B2
(45) Date of Patent: Mar. 26, 2019

(54) COPY-ON-WRITE UPDATE-TRIGGERED CONSISTENCY

(71) Applicant: HEWLETT PACKARD ENTERPRISE DEVELOPMENT LP, Houston, TX (US)

(72) Inventor: Luis Miguel Vaquero Gonzalez, Bristol (GB)

(73) Assignee: Hewlett Packard Enterprise Development LP, Houston, TX (US)

(*) Notice: Subject to any disclaimer, the term of this patent is extended or adjusted under 35 U.S.C. 154(b) by 340 days.

(21) Appl. No.: 15/021,040

(22) PCT Filed: Oct. 31, 2013

(86) PCT No.: PCT/US2013/067759
§ 371 (c)(1),
(2) Date: Mar. 10, 2016

(87) PCT Pub. No.: WO2015/065429
PCT Pub. Date: May 7, 2015

(65) Prior Publication Data
US 2016/0232197 A1    Aug. 11, 2016

(51) Int. Cl.
*G06F 17/30* (2006.01)
*G06F 9/46* (2006.01)
(Continued)

(52) U.S. Cl.
CPC ........ *G06F 17/30371* (2013.01); *G06F 3/065* (2013.01); *G06F 3/067* (2013.01);
(Continued)

(58) Field of Classification Search
CPC ........................................... G06F 17/30
(Continued)

(56) References Cited

U.S. PATENT DOCUMENTS 6,075,938 A    6/2000  Bugnion et al.
7,620,766 B1   11/2009 Waldspurger
(Continued)

OTHER PUBLICATIONS

Extended European Search Report, EP Application No. 13896540.5, dated Mar. 27, 2017, pp. 1-7, EPO.
(Continued)

*Primary Examiner* — Kim T Nguyen
(74) *Attorney, Agent, or Firm* — Hewlett Packard Enterprise Patent Department (57) ABSTRACT

According to an example, copy-on-write (COW) update-triggered consistency may include determining a first shared version related to a shared set of data related to a process involving a first application and a process involving a second application. First and second local versions may be respectively assigned to the shared set of data associated with the first and second applications. Initiation of a commit process by the first or second applications may be determined respectively based on a write to the first or second local versions respectively related to the shared set of data associated with the first or second applications. In response to initiation of the commit process, a second shared version may be generated related to the shared set of data based on the respective processes involving the first and the second applications.

11 Claims, 8 Drawing Sheets

(51) Int. Cl.
*G06F 3/06* (2006.01)
*G06F 12/1009* (2016.01)
*G06F 12/1072* (2016.01)
*G06F 9/50* (2006.01)

(52) U.S. Cl.
CPC .......... *G06F 3/0619* (2013.01); *G06F 9/466* (2013.01); *G06F 9/5016* (2013.01); *G06F 9/5077* (2013.01); *G06F 12/1009* (2013.01); *G06F 12/1072* (2013.01); *G06F 17/30377* (2013.01); *G06F 2212/656* (2013.01); *G06F 2212/657* (2013.01)

(58) Field of Classification Search
USPC ........................................................ 707/691
See application file for complete search history.

(56) References Cited

U.S. PATENT DOCUMENTS

| | | | | |
|---|---|---|---|---|
| 8,041,855 | B1* | 10/2011 | Ou | G06F 13/28 710/14 |
| 9,678,997 | B2* | 6/2017 | Burckart | G06F 17/30309 |
| 2003/0200398 | A1 | 10/2003 | Harris | |
| 2005/0262313 | A1 | 11/2005 | Holt | |
| 2007/0106993 | A1 | 5/2007 | Largman et al. | |
| 2007/0288526 | A1* | 12/2007 | Mankad | G06F 11/1662 |
| 2007/0294319 | A1* | 12/2007 | Mankad | G06F 11/1662 |
| 2008/0034364 | A1 | 2/2008 | Lam et al. | |
| 2010/0122041 | A1* | 5/2010 | Nakaike | G06F 9/466 711/147 |
| 2011/0307668 | A1 | 12/2011 | Ferr et al. | |
| 2012/0011509 | A1* | 1/2012 | Husain | G06F 9/5088 718/1 |

OTHER PUBLICATIONS

Calif Cascaval et al., "Software Transactional Memory: Why Is It Only A Research Toy?," Sep. 2008, pp. title page and 47-58, ACM QUEUE.

Didier Donsez et al., "WEA, A Distributed Object Manager based on a Workspace Hierarchy," International Conference on Applications in Parallel and Distributed Computing, Apr. 1994, pp. 1-10.

Eric Koskinen et al., "Coarse-Grained Transactions," Jan. 2010, pp. 1-12, ACM.

International Search Report and Written Opinion, International Application No. PCT/US2013/067759, dated May 30, 2014, pp. 1-8, KIPO.

Luke Dalessandro et al., "NOrec: Streamlining STM by Abolishing Ownership Records," Jan. 2010, pp. 67-77, ACM.

Philip W. Howard and Jonathan Walpole, "A Relativistic Enhancement to Software Transactional Memory," 2011, pp. 1-6, USENIX HotPar 2011.

Timothy Merrifield and Jakob Eriksson, "Conversion: Multi-Version Concurrency Control for Main Memory Segments," University of Illinois at Chicago, Mar. 8, 2013, pp. 1-13, ACM, Available at: <cs.uic.edu/~jakob/papers/merrifield-eurosys13.pdf>.

Unknown, "Memory Sharing Among Containers and Copy-On-Write Protection," 2007, pp. 1-2, Available at: <download.parallels.com/vz/v4/docs/en/win/VzWindowsUG/19930.htm>.

Vincenzo Innocente, "Sharing Memory: A Kernel Approach," AA Meeting, Mar. 4, 2009, pp. 1-11, Available at: <indico.cern.ch/getFile.py/access?contribId=38tresId=1&materialId=slides&confId=52890>.

* cited by examiner

COPY-ON-WRITE UPDATE-TRIGGERED CONSISTENCY

BACKGROUND

Transactional memory (TM) typically attempts to simplify concurrent programming by allowing a set of load and store instructions to execute in an atomic manner. Software transactional memory (STM) is a concurrency control process for controlling access to shared memory in concurrent computing. For STM, a transaction occurs when a piece of code executes a series of reads and writes to shared memory. These reads and writes logically occur at a single instant in time, with intermediate states being invisible to other transactions.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

TM allows parallelism, and may be used to detect and resolve conflicts without resorting to the complexities of fine grained locking or non-blocking synchronization. Further, STM allows programs to take advantage of disjoint access parallelism on both the read-side and write-side. However, STM based systems can have a higher overhead compared to systems based on other synchronization techniques. To reduce some of the challenges associated with STM, data may be accessed non-transactionally. For example, privatization may be used to access data non-transactionally. However, the non-transactional accesses may negate the isolation guarantees of a transactional memory system.

According to examples, a copy-on-write (COW) update-triggered consistency apparatus and a method for COW update-triggered consistency are disclosed herein. Generally, the COW process may be based on the principle that when multiple separate tasks use identical copies of the same information (i.e., data stored in a computer memory bank), separate copies of that information are not needed for each process. Instead of the separate copies, each process may be provided with a pointer to the same resource. The apparatus and method disclosed herein may provide for COW to be applied to a shared memory for version control. Each application that is to access data stored in a shared central repository may be provided with an isolated local copy (i.e., a local version) of a shared memory segment (i.e., shared data from the shared central repository). A process associated an application may be free to read/write to the isolated local copy of its shared memory segment. Changes may be maintained locally until the process associated with the application uses a commit process to commit the changed results to the shared central repository. An update process may be invoked in order for the process associated with the application to update its view of its shared memory segment. Similarly, the update process may be invoked in order for other processes associated with other applications to update their respective views of their shared memory segments.

According to examples, the apparatus and method disclosed herein may be implemented as part of a virtual memory manager of an operating system. With respect to the commit process disclosed herein, a call to commit from any of the processes sharing a memory segment may make all the isolated local copies visible to the apparatus and method disclosed herein, which, in turn, may make all the isolated local copies available to other processes. A most recent version in the memory bank may be located by maintaining a page table (e.g., a hash table). For the page table, the key may be designated as the creation date of a page, and the value may be designated as the actual content of the memory segment. A lookup table (i.e., a translation lookaside buffer (TLB)) may be flushed after a commit operation is successfully completed. Updates in local copies may be update/commit driven.

Figure 1:
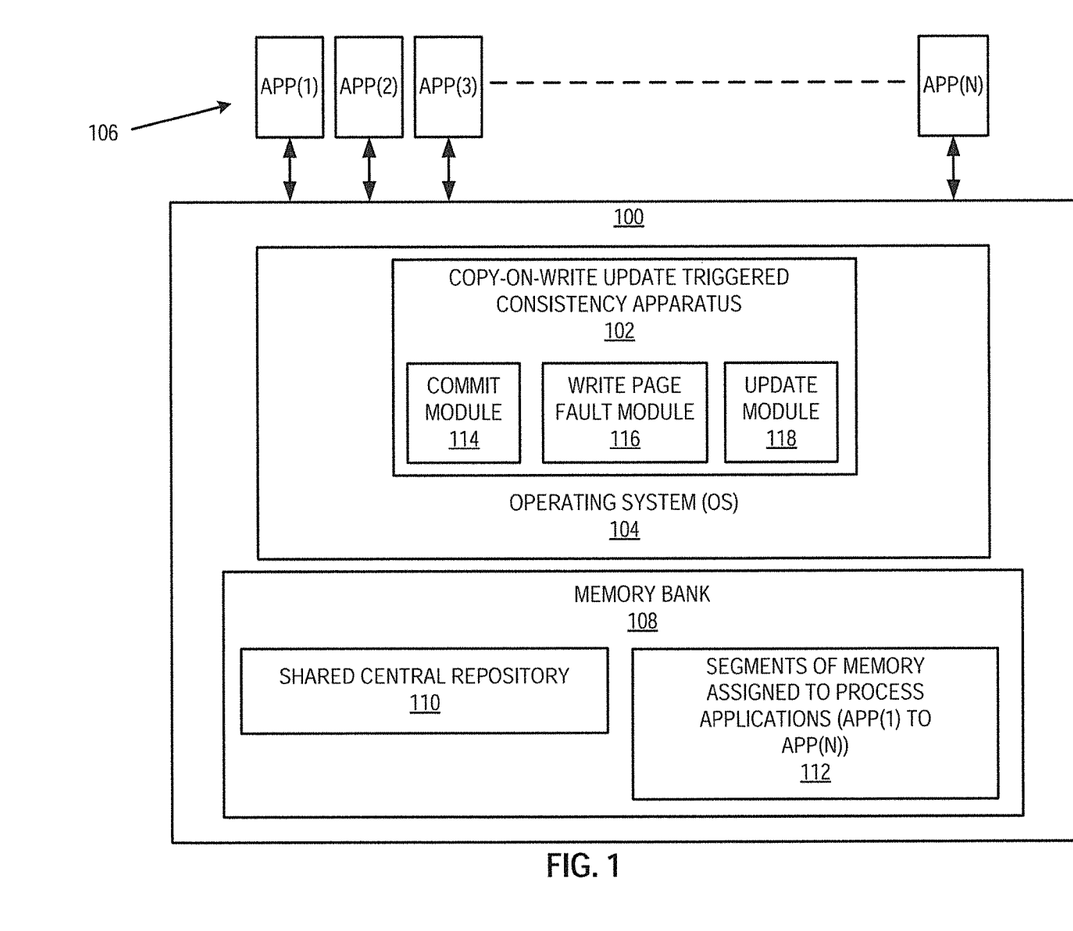
FIG. 1 illustrates an environment including a copy-on-write (COW) update-triggered consistency apparatus, according to an example of the present disclosure.

FIG. 1 illustrates an environment 100 including a COW update-triggered consistency apparatus 102, according to an example of the present disclosure. Referring to FIG. 1, the environment 100 of the COW update-triggered consistency apparatus 102 is depicted as including an operating system 104 that may include a collection of software (i.e., machine readable instructions) to manage computer hardware resources and to provide common services for computer programs. The OS 104 may provide access for applications 106 to a memory bank 108. The applications 106 may include applications (1) to (N). The memory bank 108 may include a shared central repository 110 to store a shared set of data associated with the applications 106. The memory bank 108 may further include segments of memory assigned to process applications 112 to store a local version and a page table associated with the shared set of data, as described in further detail with reference to FIG. 2. The COW update-triggered consistency apparatus 102 may include a commit module 114 to implement a commit process from the segments of memory assigned to process applications 112 to the shared central repository 110, as described in further detail with reference to FIG. 3. A write page fault module 116 may implement a write process associated with one of the applications 106, as described in further detail with reference to FIG. 4. An update module 118 may implement an update process associated with one of the applications 106, as described in further detail with reference to FIG. 5.

As described herein, the modules and other elements of the apparatus 102 may be machine readable instructions stored on a non-transitory computer readable medium. In addition, or alternatively, the modules and other elements of the apparatus 102 may be hardware or a combination of machine readable instructions and hardware.

Figure 2:
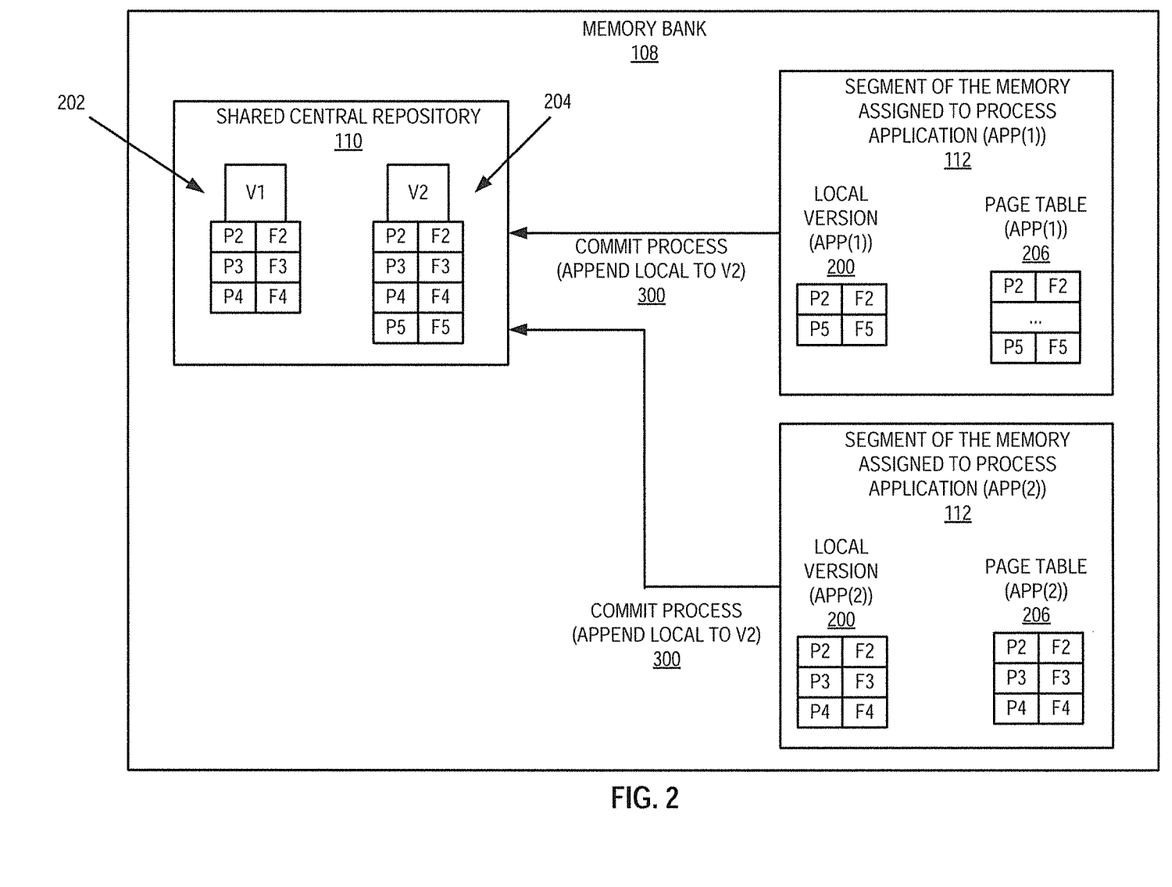
FIG. 2 illustrates a memory bank for the COW update-triggered consistency apparatus, according to an example of the present disclosure.

Referring to FIGS. 1 and 2, FIG. 2 illustrates a particular example of the memory bank 108, according to an example of the present disclosure. The COW update-triggered consistency apparatus 102 may maintain memory-mapped segments as a local version 200 (i.e., a private region) to a process involving one of the applications 106. In this manner, each process involving one of the applications 106 may maintain the local version 200 of a shared memory segment (i.e., shared data from the shared central repository 110) of the main memory bank 108. The local version 200 may generally include a page and frame based designation (e.g., {(page(1),frame(1)), . . . , (page(j),frame(j))}). Further, page(1) may be designated as P1, page(2) may be designated as P2, etc. Similarly, frame(1) may be designated as F1, frame(2) may be designated as F2, etc. A page may represent a logical page in the memory bank 108. A frame may represent a physical frame number where the most recent version of that logical page is stored.

With respect to the local version 200 for the particular example of FIG. 2, assuming that one of the applications 106 (e.g., App(1)) that is associated with the segment of memory assigned to process application 112 obtains an original version 202 (e.g., V1) from the shared central repository 110, and another one of the applications 106 (e.g., App(2)) also modifies V1, when the App(1) commits its local version 200 to the shared central repository 110, the App(1) has modified V1 by deleting (P3,F3), and (P4,F4), and adding (P5,F5). Assume that the App(2) has also modified Vito retain (P3,F3) and (P4,F4), and committed its local version 200 to the shared central repository 110. Thus, for the App(2), the local version 200 would include (P2,F2), (P3, F3), and (P4,F4). Further, for the App(1), the local version 200 would include (P2,F2) and (P5,F5). When the local version 200 for the App(1) is committed to the shared central repository 110, a new version 204 (e.g., V2) would therefore further include (P5,F5) appended as shown in FIG. 2.

The local version 200 may be based on a duplicate mapping of the same physical memory frames (e.g., from the shared central repository 110) referenced by a page table 206. The page table 206 may generally indicate a location of the appropriate page and frame in the shared central repository 110. For the page table 206, a key may be designated as the creation date, and a value (e.g., P2, P5, etc., for the example of FIG. 2) may be designated as the actual content of the memory segment (e.g., the segment of memory assigned to process applications 112). Shared frames between processes (e.g., any of the frames in any of the versions in the shared central repository 110), or between processes and the page table 206, may be flagged as read-only in the table entries for the page table 206. For the example of FIG. 2, frame F2 may be flagged as read-only in the table entries for the page table 206. If another process associated with another one of the applications 106 tries to write, a new frame may be allocated with the content of the original frame. A writer may write to this new frame rather than to the initial frame. A new pair (page, frame#) may added to the local set of changes. Further, a reference to the original page may be stored locally for merging, for example, in the page table 206. For the example of FIG. 2 for App(1), a new frame F5 may be allocated with the content of the original frame F2.

According to a further example, assume V1 in the shared central repository 110 includes (P6,F6) that is a read-only frame. If an application attempts to write to (P6,F6), a new frame F7 may be allocated with the content P6 of the original frame F6. A new pair (P7,F7) may added to the local set of changes, where P7 may represent the new content originally associated with the content P6.

When a process involving one of the applications 106 attempts to write, the COW update-triggered consistency apparatus 102 may execute a COW page fault, as disclosed herein with respect to a write page fault process 400 described in further detail with reference to FIG. 4. A snapshot process may be used by the process involving the particular application 106 to create a new segment (e.g., (P7,F7) in the previous example may be allocated to V2). Any write to this new segment may remain private, using COW memory protection, until the commit module 114 issues a commit to place the local modification (e.g., deletion of (P3,F3) and (P4,F4), and addition of (P5,F5) for App(1) for the example of FIG. 2) to the local version 200 in the central version (e.g., V2 for the example of FIG. 2) of the shared central repository 110, making these changes visible to other processes. For the example of FIG. 2, committing local changes to the shared central repository 110 may prompt the addition of the new version 204 (i.e., the version V2) to the shared central repository 110. A commit process 300 is described in further detail with reference to FIG. 3. Changes may be tracked at page level as shown for the example of FIG. 2. Alternatively or additionally, changes may be tracked at a different granularity level (e.g., byte level, etc.). The update module 118 may issue an update to pull data from the shared central repository 110 into the process-exclusive location (e.g., the segment of memory assigned to process applications 112 for the particular application 106). An update process 500 is described in further detail with reference to FIG. 5. For page disjoint modifications, the update module 118 may modify the page table 206 of the calling process to the latest snapshot (e.g., V2 for the example of FIG. 2) of the shared central repository 110.

Figure 3:
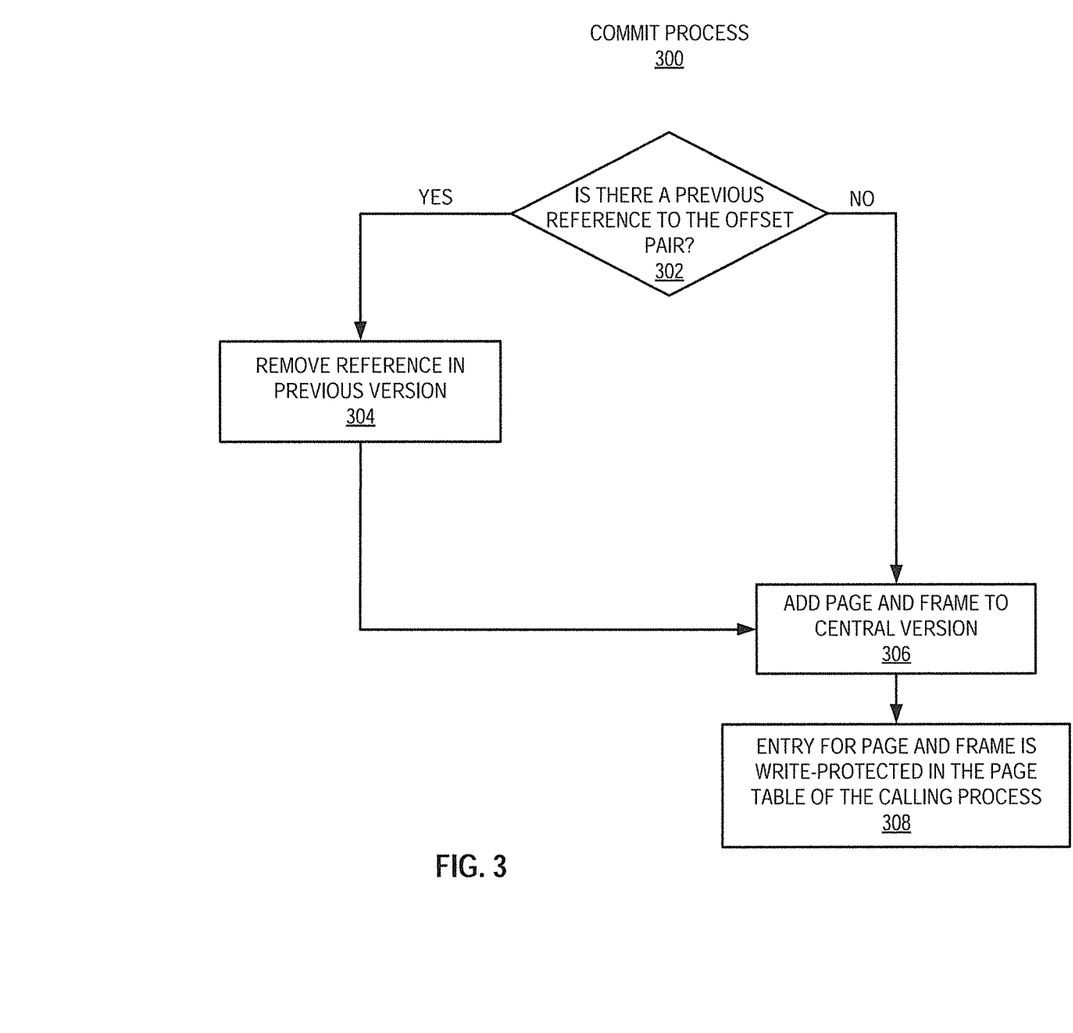
FIG. 3 illustrates a flowchart for implementing a commit process for the COW update-triggered consistency apparatus, according to an example of the present disclosure.

Referring to FIGS. 1 and 3, FIG. 3 illustrates a flowchart of the commit process 300 for the COW update-triggered consistency apparatus 102, according to an example of the present disclosure.

With respect to the commit process 300 that is implemented by the commit module 114, generally, committing local changes to the shared central repository 110 may prompt the addition of the new version 204 to the shared central repository 110. If needed, a new pair (page, frame#) may be added to the new version 204. For the example of FIG. 2, a new pair (P5, F5) may be added to the version V2 kept in the shared central repository 110.

For the commit process 300, at block 302, the commit module 114 may further determine whether there is a previous reference to the offset pair (e.g., (P2, F2) and (P5,F5) from the local version 200 for the App(1) for the example of FIG. 2). For example, at block 302, the commit module 114 may determine whether a previous version (i.e., the version in the shared central repository 110) of a given pair (page, frame#) existed for the page from the given pair in the shared central repository 110. Thus, for the example of FIG. 2, the offset pairs (P2, F2) and (P5,F5) from the local version 200 for the App(1) may be separately compared to V1 and V2 in the shared central repository 110 at each invocation of block 302.

At block 304, if the determination at block 302 is yes, the reference in the previous version may be removed. For the example of FIG. 2, the reference in the previous version 202 (e.g., V1) in the shared central repository 110 may be removed for the offset pair (P2, F2).

At block 306, if the determination at block 302 is no or following block 304, the page and frame may be added to the central version. For the example of FIG. 2, for the App(1), following block 304, the page and frame (P2, F2) may be added to the central version (e.g., V2). Similarly, for the App(1), following block 302, the page and frame (P5, F5) may be added to the central version (e.g., V2).

At block 308, the entry for a page and frame (e.g., (P2,F2) and (P5,F5) for App(1) for the example of FIG. 2) may be write-protected in the page table 206 of the calling process. In other words, the entry for the page table 206 corresponding to a page and frame may be marked as protected, forcing a COW page fault on the next write attempt to this page.

With respect to the commit process 300, the local version 200 may represent a duplicate mapping of the same physical memory frames referenced by the page table 206. Any frames shared between processes may be marked as read-only in their respective page entries.

The shared central repository 110 may be subject to extensive contention between processes. The COW update-triggered consistency apparatus 102 may use a single read-write lock to protect the shared central repository 110 from race conditions. Race conditions may generally represent behavior of a system where the output is dependent on a sequence or timing of other uncontrollable events.

With respect to scalability for the shared central repository 110, it may not be thread safe to allow an update to traverse the page table 206 while a commit may be removing old entries for the very same pages being committed (e.g., P2 for the App(1) for the example of FIG. 2). The commit process 300 may therefore mark old entries as obsolete, and deletion deferred whereby a new field is added to the pair (e.g., (P2,F2) for the App(1) for the example of FIG. 2) for the new version (e.g., V2 for the example of FIG. 2), indicating the version (e.g., V1 for the example of FIG. 2) that made old entries obsolete. An update, as described in further detail with reference to update process 500 of FIG. 5, may now check this new field. If the entry is obsolete, then nothing may be done on that entry. Removal of obsolete entries may be performed, for example, as a background kernel space process.

With respect to concurrency, for the COW update-triggered consistency apparatus 102, concurrency may be implemented by providing committers (e.g., different ones of the applications 106 that initiate a commit process) access to different pages in a concurrent manner. Pages with a single committer (e.g., a single application 106 that initiates a commit process) may be committed concurrently. Since a thread acquires a new version on calling commit, pages with more than one committer may let the committing proceed in version order. A version map (not shown) may store the arrival order so that committers themselves can write when it is safe to do so (e.g., they are first on the version map).

Figure 4:
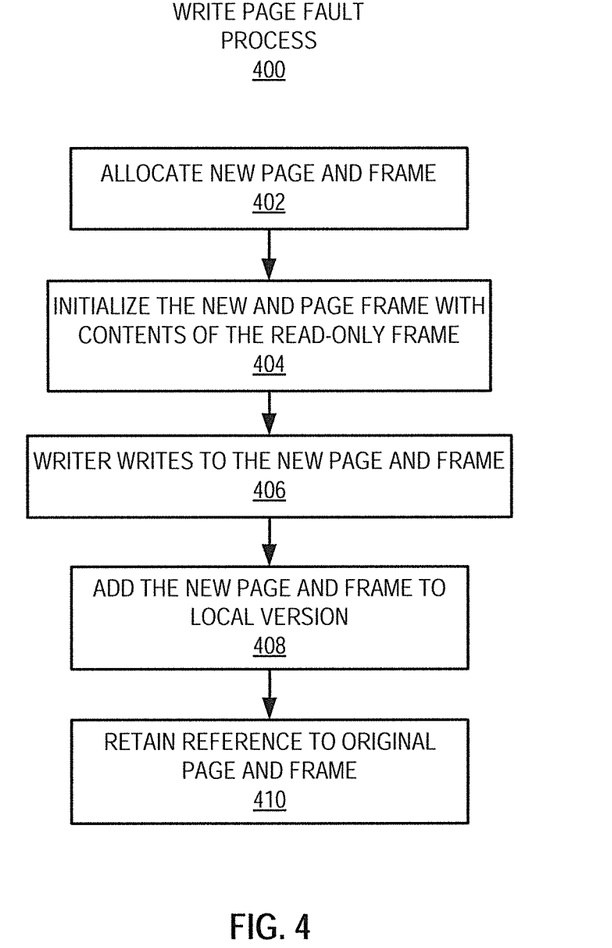
FIG. 4 illustrates a flowchart for implementing a write page fault process for the COW update-triggered consistency apparatus, according to an example of the present disclosure.

Referring to FIGS. 1 and 4, FIG. 4 illustrates a flowchart of the write page fault process 400 for the COW update-triggered consistency apparatus 102, according to an example of the present disclosure.

With respect to the write page fault process 400 that is implemented by the write page fault module 116, at block 402, a new page and frame may be allocated. For the example of FIG. 2, for the App(1), a new page and frame (P5,F5) may be allocated.

At block 404, the new page and frame may be initialized with contents from the read-only frame. For the example of FIG. 2, for the App(1), the new page and frame (P5,F5) may be initialized with contents from the read-only frame (e.g., based on the write-protection applied by block 308 for the commit process 300).

At block 406, the new and page frame may be written to. For the example of FIG. 2, for the App(1), the new and page frame (P5,F5) may be written to.

At block 408, the new and page frame may be added to the local version. For the example of FIG. 2, for the App(1), the new and page frame (P5,F5) may be added to the local version 200.

At block 410, the COW update-triggered consistency apparatus 102 may retain reference to the original page and frame in the page table 206. For the example of FIG. 2, for the App(1), the COW update-triggered consistency apparatus 102 may retain reference to the original page and frame (P2,F2) in the page table 206.

Figure 5:
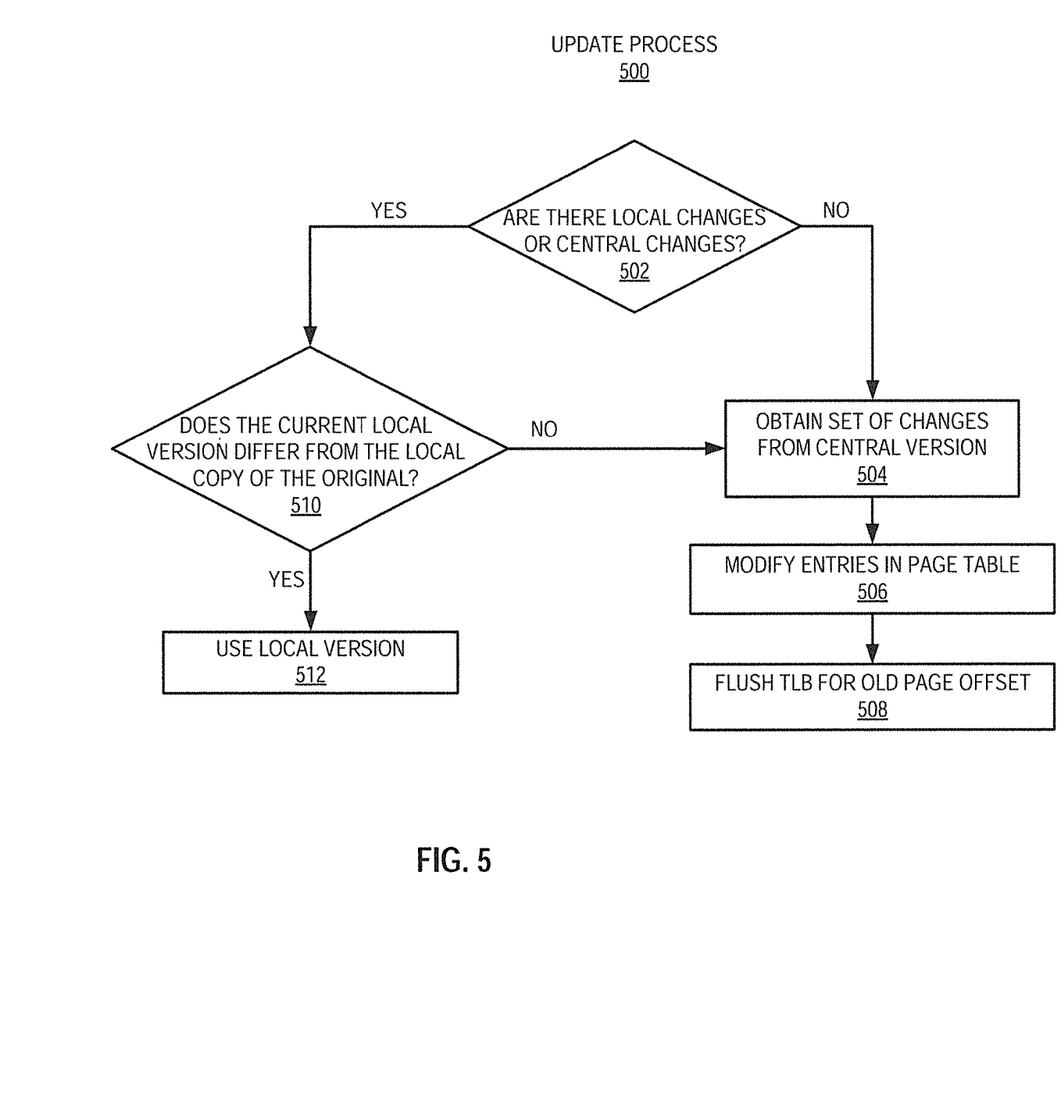
FIG. 5 illustrates a flowchart for implementing an update process for the COW update-triggered consistency apparatus, according to an example of the present disclosure.

Referring to FIGS. 1 and 5, FIG. 5 illustrates a flowchart of an update process 500 for the COW update-triggered consistency apparatus 102, according to an example of the present disclosure.

With respect to the update process 500 that is implemented by the update module 118, when a process needs an updated view of the shared memory bank 108, and thus the shared central repository 110, the caller's view (e.g., the local version 200 for the example of FIG. 2) of the segment may be updated to reflect the most current version. The update process 500 may modify the caller's page table (e.g., page table 206 for the example of FIG. 2) to point to the most recent version (e.g., V2 for the example of FIG. 2) of each page. When updating, the central array (e.g., V2 for the example of FIG. 2) may provide a set of changes {(page1, frame1), . . . ,(pagej,framej)} that occurred on the central array since the last time that process updated and the current time.

For the update process 500, at block 502, the update module 118 may determine if there are any local changes or central changes. For the example of FIG. 2, the update module 118 may determine if there are any local changes to the local version 200 or central changes (e.g., to V1) in the shared central repository 110.

If the determination at block 502 is no, at block 504, the update module 118 may obtain a set of changes from the central version. For the example of FIG. 2, the update module 118 may obtain a set of changes between V1 and V2.

For each entry in the set of changes, at block 506, the update module 118 may modify the entries in the page table. For the example of FIG. 2, the update module 118 may modify the entries in the page table 206.

For each entry in the set of changes, at block 508, the update module 118 may flush the TLB (not shown) for the address at the given page number (page_i).

With respect to the update process 500, according to an example, the local version 200 of the process may not change (e.g., the central array V2 may be changed by receiving commits from other processes). Alternatively, if the local copy per the local version 200 and the central version (e.g., V1 for the example of FIG. 2) in the shared central repository 110 are both changed between calls to update, a conflict may arise. A reference to the original version (e.g., a local copy of V1 in example of FIG. 2) of each page may be kept in the process exclusive space (e.g., segment of memory assigned to process application 112 for the example of FIG. 2).

The merging of the conflicting local and central versions may then proceed such that if the local version differs from the local copy of the original, the local version is used. For example, if the determination at block 502 is yes, at block 510, the update module 118 may determine if the current local version differs from the local copy of the original. For the example of FIG. 2, the update module 118 may determine if the current local version 200 differs from the local copy of the original (e.g., V1).

If the determination at block 510 is yes, at block 512, the update module 118 may use the local version. For the example of FIG. 2, the update module 118 may use the local version 200.

If the determination at block 510 is no, at block 504, the version from the set of changes (e.g., from the shared central repository 110) may be used. In other words, at block 504, the update module 118 may obtain a set of changes from the central version (e.g., difference between V1 and V2 for the example of FIG. 2).

The update module 118 may allow users to indicate a modification unit (i.e., granularity level) for any given segment, and merge any disjoint set of changes of the given unit size. If the sets are not disjoint, the local version (e.g., local version 200 for the example of FIG. 2) may be preferred. Further, the update module 118 may also use mutual exclusion techniques to avoid concurrent writes. The result of the update may be a failed status that triggers a retry of the local computation.

Figure 6:
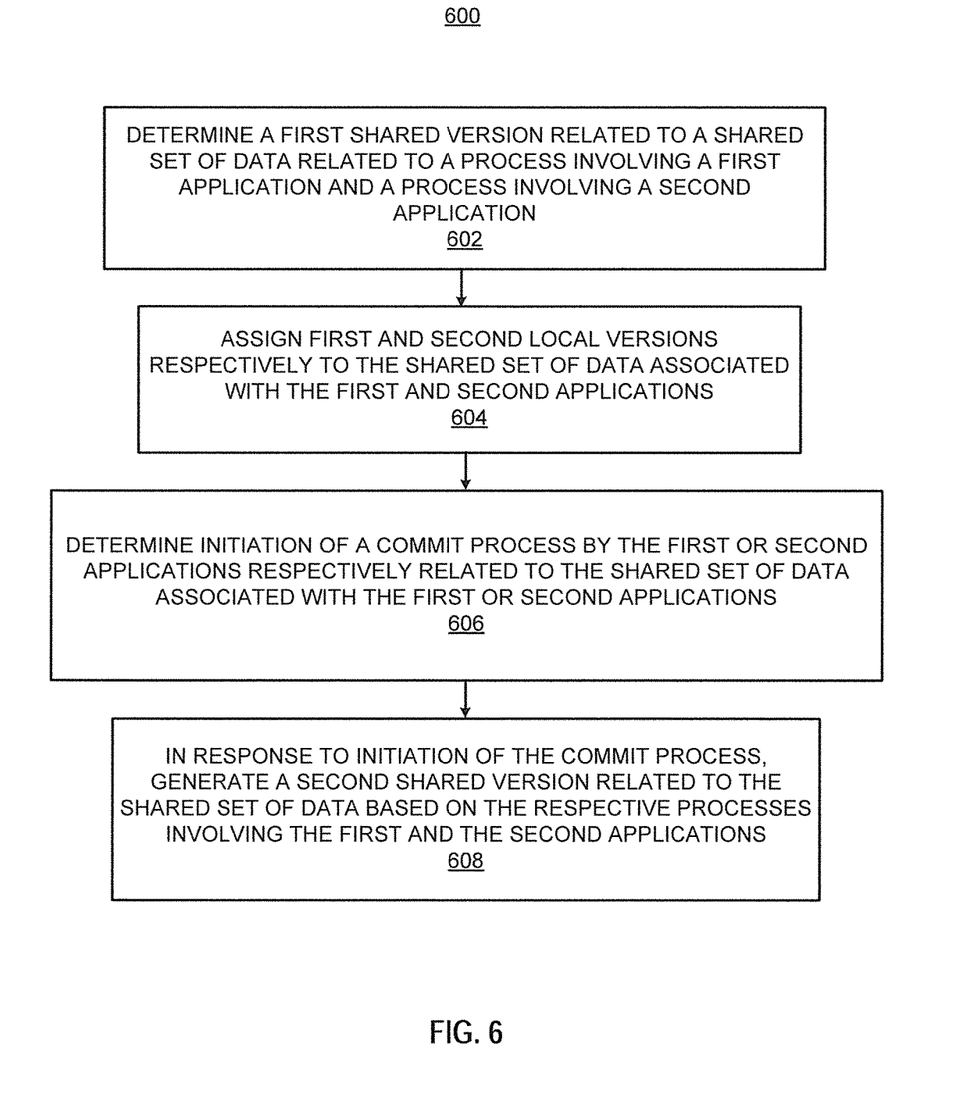
FIG. 6 illustrates a flowchart for a method for COW update-triggered consistency, according to an example of the present disclosure.
Figure 7:
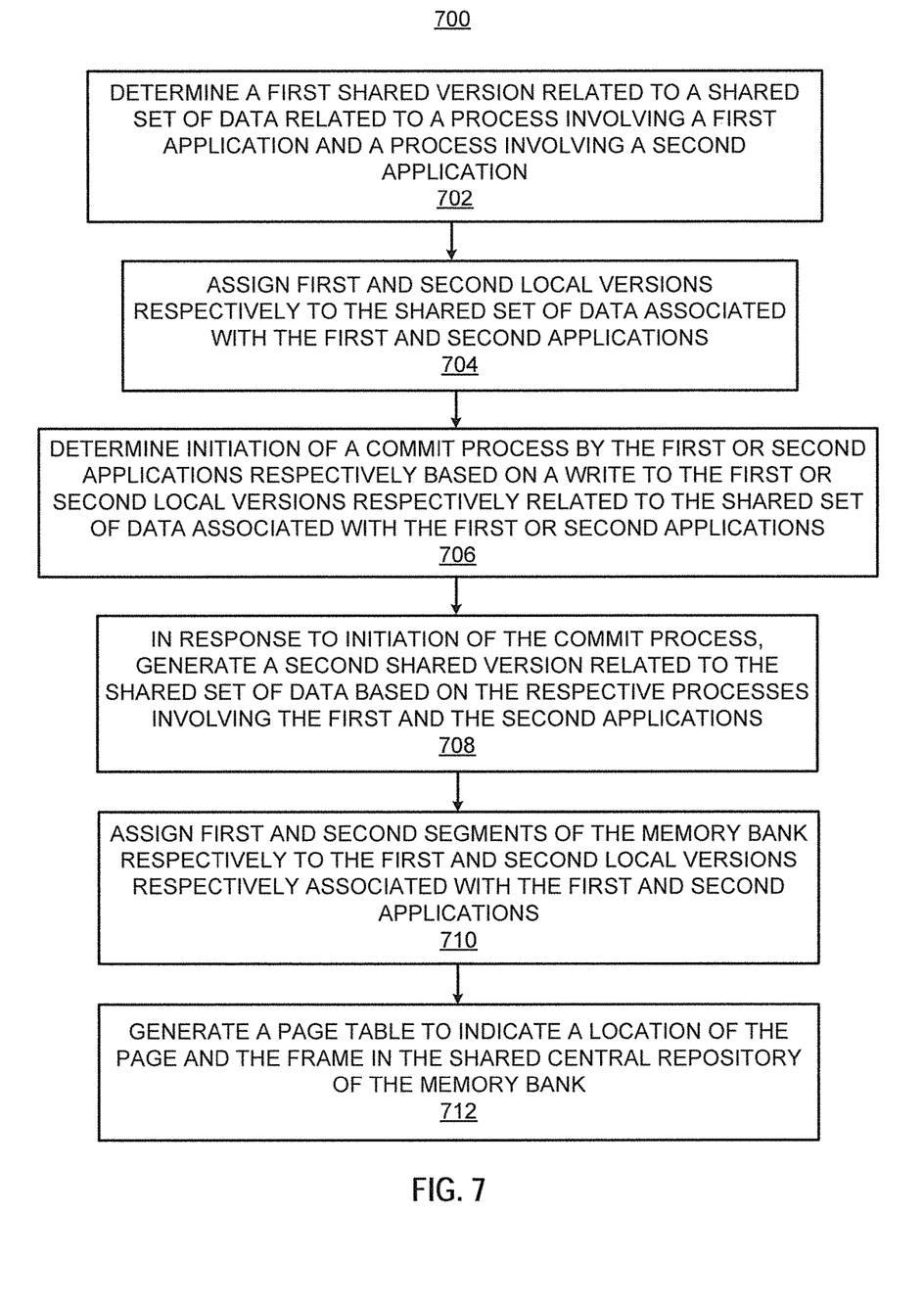
FIG. 7 illustrates further details of the flowchart for the method for COW update-triggered consistency, according to an example of the present disclosure.

FIGS. 6 and 7 respectively illustrate flowcharts of methods 600 and 700 for COW update-triggered consistency, corresponding to the example of the COW update-triggered consistency apparatus 102 whose construction is described in detail above. The methods 600 and 700 may be implemented on the COW update-triggered consistency apparatus 102 with reference to FIGS. 1-5 by way of example and not limitation. The methods 600 and 700 may be practiced in other apparatus.

Referring to FIG. 6, for the method 600, at block 602, the method may include determining a first shared version related to a shared set of data related to a process involving a first application and a process involving a second application. For example, referring to FIGS. 1 and 2, the method may include determining a first shared version (e.g., V1) related to a shared set of data related to a process involving a first application (e.g., App(1)) and a process involving a second application (e.g., App(2)).

At block 604, the method may include assigning first and second local versions respectively to the shared set of data associated with the first and second applications. For example, referring to FIGS. 1 and 2, the method may include assigning first and second local versions (e.g., local versions 200 for App(1) and App(2)) respectively to the shared set of data associated with the first and second applications (e.g., App(1) and App(2)).

At block 606, the method may include determining initiation of a commit process by the first or second applications respectively related to the shared set of data associated with the first or second applications. For example, referring to FIGS. 1 and 2, the method may include determining initiation of a commit process (e.g., the commit process 300) by the first or second applications (e.g., App(1) or App(2)) respectively (e.g., based on a write to the local versions 200 for App(1) or App(2)) related to the shared set of data associated with the first or second applications.

At block 608, in response to initiation of the commit process, the method may include generating a second shared version related to the shared set of data based on the respective processes involving the first and the second applications. For example, referring to FIGS. 1 and 2, in response to initiation of the commit process, the method may include generating a second shared version (e.g., V2) related to the shared set of data based on the respective processes involving the first and the second applications (e.g., App(1) and App(2)).

According to an example, for the method 600, the commit process may further includes determining (e.g., at block 302 of FIG. 3) if there is a previous reference to an offset pair including a page and frame associated with a respective one of the first and second local versions in the shared central repository of the memory bank. In response to a determination that there is a previous reference to the offset pair, the method 600 may include removing (e.g., at block 304 of FIG. 3) a reference to the offset pair in the first shared version from the shared central repository of the memory bank. Further, in response to a determination that there is no previous reference to the offset pair, the method 600 may further include adding (e.g., at block 306 of FIG. 3) the offset pair to the second shared version in the shared central repository of the memory bank, and marking (e.g., at block 308 of FIG. 3) an entry for the offset pair as write-protected in a page table.

According to an example, the method 600 may further include determining the write associated with the process involving the first application or the process involving the second application, allocating (e.g., at block 402 of FIG. 4) a new page and frame in the local version of the first application or the second application associated with the write, initializing (e.g., at block 404 of FIG. 4) the new page and frame with contents of a read-only frame, entering write contents (e.g., at block 406 of FIG. 4) to the new page and frame, and adding (e.g., at block 408 of FIG. 4) the new page and frame to the local version of the first application or the second application associated with the write.

According to an example, the method 600 may further include determining an update associated with the process involving the first application or the process involving the second application, and determining (e.g., at block 502 of FIG. 5) if there are changes to the first or second local versions, or if there are changes to the shared set of data resident in the shared central repository of the memory bank. In response to a determination that there are changes to the first or second local versions, or that there are changes to the shared set of data resident in the shared central repository of the memory bank, the method 600 may further include determining (e.g., at block 510 of FIG. 5) if a current local version differs from a local copy of the shared set of data resident in the shared central repository of the memory bank. In response to a determination that the current local version differs from a local copy of the shared set of data resident in the shared central repository of the memory bank, the method 600 may further include using (e.g., at block 512 of FIG. 5) the current local version as an updated local version. In response to a determination that the current local version does not differ from a local copy of the shared set of data resident in the shared central repository of the memory bank, the method 600 may further include obtaining (e.g., at block 504 of FIG. 5) a set of changes from a central version resident in the shared central repository of the memory bank.

According to an example, the method 600 may further include determining an update associated with the process involving the first application or the process involving the second application, and determining (e.g., at block 502 of FIG. 5) if there are changes to the first or second local versions, or if there are changes to the shared set of data resident in the shared central repository of the memory bank. In response to a determination that there are no changes to the first or second local versions, or that there are no changes to the shared set of data resident in the shared central repository of the memory bank, the method 600 may further include obtaining (e.g., at block 504 of FIG. 5) a set of changes from a central version resident in the shared central repository of the memory bank.

Referring to FIG. 7, for the method 700, at block 702, the method may include determining a first shared version related to a shared set of data related to a process involving a first application and a process involving a second application.

At block 704, the method may include assigning first and second local versions respectively to the shared set of data associated with the first and second applications.

At block 706, the method may include determining initiation of a commit process by the first or second applications respectively based on a write to the first or second local versions respectively related to the shared set of data associated with the first or second applications.

At block 708, in response to initiation of the commit process, the method may include generating a second shared version related to the shared set of data based on the respective processes involving the first and the second applications.

At block 710, the method may include assigning first and second segments of the memory bank respectively to the first and second local versions respectively associated with the first and second applications. For example, referring to FIGS. 1 and 2, the method may include assigning first and second segments (e.g., see FIG. 2, segments for App(1) and App(2)) of the memory bank 108 respectively to the first and second local versions respectively associated with the first and second applications.

At block 712, the method may include generating a page table to indicate a location of the page and the frame in the shared central repository of the memory bank. For example, referring to FIGS. 1 and 2, the method may include generating a page table 206 to indicate a location of the page and the frame in the shared central repository 110 of the memory bank 108.

Figure 8:
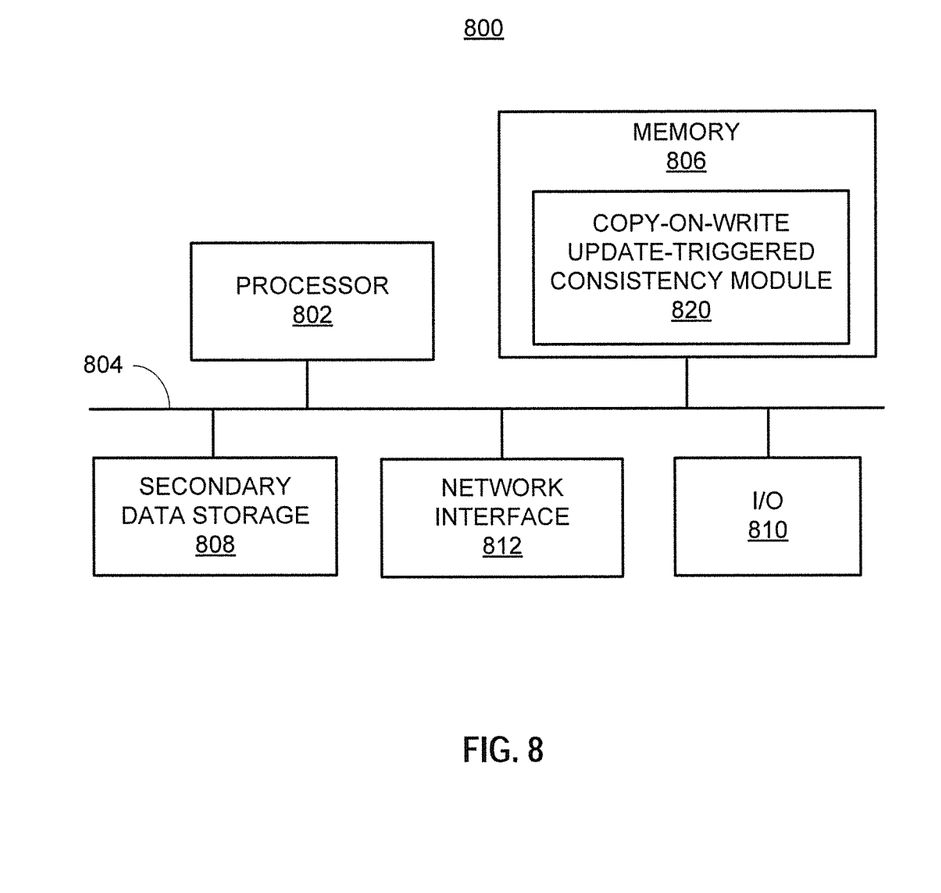
FIG. 8 illustrates a computer system for implementing the COW update-triggered consistency apparatus, according to an example of the present disclosure.

FIG. 8 shows a computer system 800 that may be used with the examples described herein. The computer system may represent a generic platform that includes components that may be in a server or another computer system. The computer system 800 may be used as a platform for the apparatus 102. The computer system 800 may execute, by a processor (i.e., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 may include a processor 802 that may implement or execute machine readable instructions performing some or all of the methods, functions and other processes described herein. Commands and data from the processor 802 may be communicated over a communication bus 804. The computer system may also include a main memory 806, such as a random access memory (RAM), where the machine readable instructions and data for the processor 802 may reside during runtime, and a secondary data storage 808, which may be non-volatile and stores machine readable instructions and data. The memory and data storage are examples of computer readable mediums. The memory 806 may include a COW update-triggered consistency module 820 including machine readable instructions residing in the memory 806 during runtime and executed by the processor 802. The COW update-triggered consistency module 820 may include the modules of the apparatus 102 shown in FIG. 1.

The computer system 800 may include an I/O device 810, such as a keyboard, a mouse, a display, etc. The computer system may include a network interface 812 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable medium having stored thereon machine readable instructions to provide copy-on-write (COW) update-triggered consistency, the machine readable instructions, when executed, cause at least one processor to:
   determine a first shared version related to a shared set of data related to a process involving a first application and a process involving a second application, wherein the shared set of data is resident in a shared central repository of a memory bank;
   assign first and second local versions respectively to the shared set of data associated with the first and second applications;
   determine initiation of a commit process by the first or second applications respectively based on a write to the first or second local versions respectively related to the shared set of data associated with the first or second applications; and
   in response to initiation of the commit process, generate a second shared version related to the shared set of data based on the respective processes involving the first and the second applications, wherein the first and second local versions each include a page that represents a logical page in the memory bank, and a frame that represents a physical frame number where a most recent version of the logical page is stored in the memory bank.

2. The non-transitory computer readable medium of claim 1, the machine readable instructions, when executed, further cause the at least one processor to:
   assign first and second segments of the memory bank respectively to the first and second local versions respectively associated with the first and second applications.

3. The non-transitory computer readable medium of claim 1, the machine readable instructions, when executed, further cause the at least one processor to: generate a page table to indicate a location of the page and the frame in the shared central repository of the memory bank.

4. The non-transitory computer readable medium of claim 1, wherein the processes involving the first and the second applications further include a read associated with the first or second local versions.

5. The non-transitory computer readable medium of claim 1, wherein the commit process further comprises the machine readable instructions to cause the at least one processor to:
   determine if there is a previous reference to an offset pair including a page and frame associated with a respective one of the first and second local versions in the shared central repository of the memory bank;
   in response to a determination that there is a previous reference to the offset pair, remove a reference to the offset pair in the first shared version from the shared central repository of the memory bank;
   in response to a determination that there is no previous reference to the offset pair, add the offset pair to the second shared version in the shared central repository of the memory bank; and
   mark an entry for the offset pair as write-protected in a page table.

6. The non-transitory computer readable medium of claim 1, the machine readable instructions, when executed, further cause the at least one processor to:
   determine the write associated with the process involving the first application or the process involving the second application;
   allocate a new page and frame in the local version of the first application or the second application associated with the write;
   initialize the new page and frame with contents of a read-only frame;
   enter write contents to the new page and frame; and
   add the new page and frame to the local version of the first application or the second application associated with the write.

7. The non-transitory computer readable medium of claim 1, the machine readable instructions, when executed, further cause the at least one processor to:
   determine an update associated with the process involving the first application or the process involving the second application;
   determine if there are changes to the first or second local versions, or if there are changes to the shared set of data resident in the shared central repository of the memory bank;
   in response to a determination that there are changes to the first or second local versions, or that there are changes to the shared set of data resident in the shared central repository of the memory bank, determine if a current local version differs from a local copy of the shared set of data resident in the shared central repository of the memory bank;
   in response to a determination that the current local version differs from a local copy of the shared set of data resident in the shared central repository of the memory bank, use the current local version as an updated local version; and
   in response to a determination that the current local version does not differ from a local copy of the shared set of data resident in the shared central repository of the memory bank, obtain a set of changes from a central version resident in the shared central repository of the memory bank.

8. The non-transitory computer readable medium of claim 1, the machine readable instructions, when executed, further cause the at least one processor to:
   determine an update associated with the process involving the first application or the process involving the second application;
   determine if there are changes to the first or second local versions, or if there are changes to the shared set of data resident in the shared central repository of the memory bank; and
   in response to a determination that there are no changes to the first or second local versions, or that there are no changes to the shared set of data resident in the shared central repository of the memory bank, obtain a set of changes from a central version resident in the shared central repository of the memory bank.

9. A copy-on-write (COW) update-triggered consistency apparatus comprising:
   at least one processor; and
   a memory storing machine readable instructions that when executed by the at least one processor cause the at least one processor to:
   determine a first shared version related to a shared set of data related to a process involving a first application and a process involving a second application, wherein the shared set of data is resident in a shared central repository of a memory bank of the memory;
   assign first and second local versions respectively to the shared set of data associated with the first and second applications;
   assign first and second segments of the memory bank respectively to the first and second local versions respectively associated with the first and second applications;
   determine initiation of a commit process by the first or second applications respectively based on a write to the first or second local versions respectively related to the shared set of data associated with the first or second applications; and
   in response to initiation of the commit process, generate a second shared version related to the shared set of data based on the respective processes involving the first and the second applications,
   determine if there is a previous reference to an offset pair including a page and frame associated with a respective one of the first and second local versions in the shared central repository of the memory bank;
   in response to a determination that there is a previous reference to the offset pair, remove a reference to the offset pair in the first shared version from the shared central repository of the memory bank; and
   in response to a determination that there is no previous reference to the offset pair, add the offset pair to the second shared version in the shared central repository of the memory bank.

10. A method for copy-on-write (COW) update-triggered consistency, the method comprising:
    determining a first shared version related to a shared set of data related to a process involving a first application and a process involving a second application;
    assigning first and second local versions respectively to the shared set of data associated with the first and second applications;

determining initiation of a commit process by the first or second applications respectively related to the shared set of data associated with the first or second applications; and in response to initiation of the commit process, generating, by at least one processor, a second shared version related to the shared set of data based on the respective processes involving the first and the second applications;

determining an update associated with the process involving the first application or the process involving the second application;

determining if there are changes to the first or second local versions, or if there are changes to the shared set of data resident in the shared central repository of the memory bank; and in response to a determination that there are no changes to the first or second local versions, or that there are no changes to the shared set of data resident in the shared central repository of the memory bank, obtaining a set of changes from a central version resident in the shared central repository of the memory bank.

11. The method of claim 10, further comprising:

in response to a determination that there are changes to the first or second local versions, or that there are changes to the shared set of data resident in the shared central repository of the memory bank, determining if a current local version differs from a local copy of the shared set of data resident in the shared central repository of the memory bank; and in response to a determination that the current local version differs from a local copy of the shared set of data resident in the shared central repository of the memory bank, using the current local version as an updated local version.

* * * * *